C. H. RICHARDSON.
WINDLASS.
APPLICATION FILED NOV. 5, 1908.
928,330.
Patented July 20, 1909.
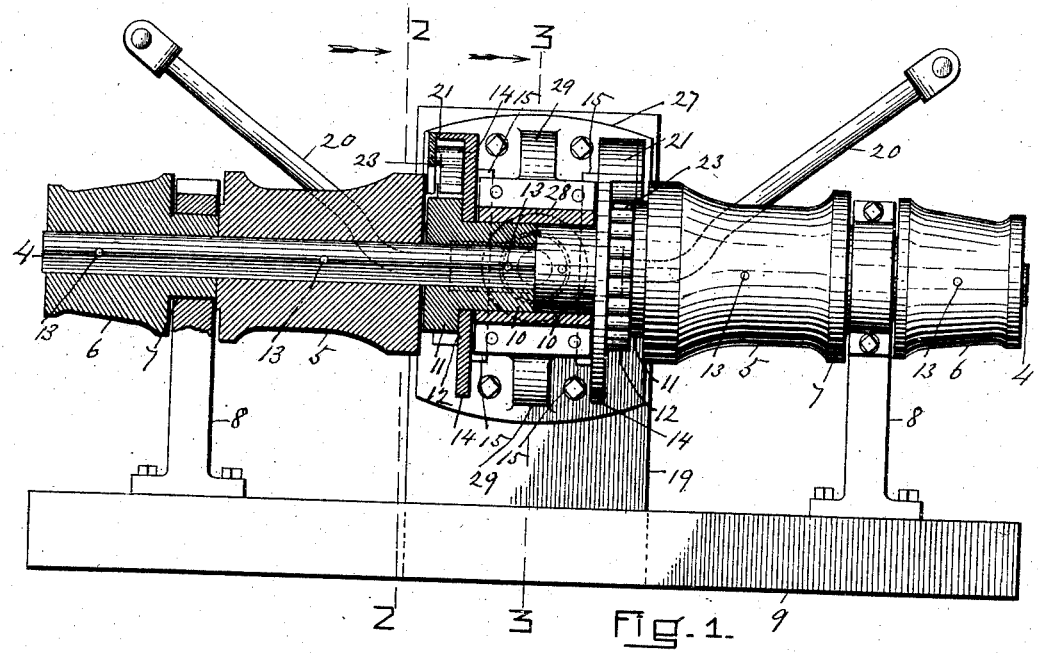
Fig. 1.
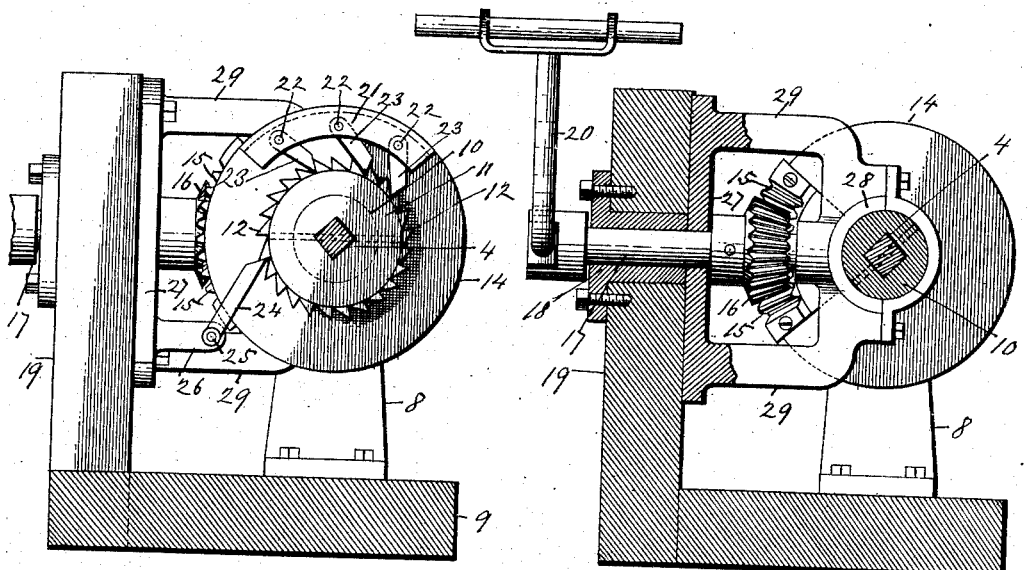
Fig. 2.
Fig. 3.
WITNESSES:
M. A. Attwood.
Frank G. Parker.
INVENTOR:
Charles H. Richardson,
By his Att'y.

UNITED STATES PATENT OFFICE.

CHARLES H. RICHARDSON, OF GLOUCESTER, MASSACHUSETTS, ASSIGNOR OF ONE-HALF TO DAVID B. SMITH, BENJAMIN A. SMITH, THOMAS J. CARROLL, CHARLES H. GAMAGE, AND THOMAS S. GORTON, OF GLOUCESTER, MASSACHUSETTS.

WINDLASS.

No. 928,330.      Specification of Letters Patent.      Patented July 20, 1909.

Application filed November 5, 1908. Serial No. 461,120.

*To all whom it may concern:*

Be it known that I, CHARLES H. RICHARDSON, a citizen of the United States, residing in Gloucester, in the county of Essex and State of Massachusetts, have invented new and useful Improvements in Windlasses, of which the following is a specification.

This invention is an improvement in windlasses, more particularly for use on ship-board, and it relates to a certain new and improved construction and arrangement of parts whereby great strength and rigidity are provided throughout the entire length of the windlass, and the windlass can be operated at good speed with great economy as to the expenditure of power and without lost motion or backlash.

The nature of the invention is fully described in detail below, and illustrated in the accompanying drawings, in which:—

Figure 1 is a view partly in elevation and partly in longitudinal section of a windlass embodying my invention or improvement. Fig. 2 is a cross vertical section taken on line 2—2, Fig. 1, looking toward the right. Fig. 3 is a cross vertical section taken on line 3—3, Fig. 1, looking toward the right.

Similar numerals of reference indicate corresponding parts.

Reference-numeral 4 represents a squared shaft which extends through the entire length of the windlass. Mounted on this shaft are two windlass-barrels or main drums 5, and two end-drums 6, the end-drums having their bearings 7 in suitable standards 8 adapted to be supported by the deck 9. The two barrels 5 are exactly alike, one being adapted to receive a chain and the other a cable to be used in dropping and weighing anchors, and the end-drums 6 are also exactly alike and are adapted for use in hoisting sails etc. Mounted on the shaft between the inner ends of the main drums 5 are a pair of hubs 10 whose inner ends abut against each other and whose outer ends are provided with integral flanges 11 whose peripheries are formed with ratchet teeth 12. These hubs therefore with their flanged ends and the drums 5 and 6 all rotate with the squared shaft, suitable pins 13 being provided. Mounted on this hub at its opposite ends next the flanges 11 and adapted to slip thereon are two disk-wheels 14 provided on their inner faces with segment bevel-gears 15, said segment gears being exactly alike and of the same length, and adapted to be engaged by the bevel-gear wheel 16 on the horizontal shaft 17 having its bearings at 18 in an upright or standard 19 and being provided at its outer end with the ordinary brakes 20. The outer faces of the disk-wheels 14 are provided with suitable curved housings 21 in which are pivotally hung at 22 a series (preferably three) of gravity-pawls 23 which are in engagement with the ratchet teeth 12. Holding pawls 24 are pivotally connected at 25 to brackets 26 which extend from the plate 27 secured to the upright 19, and are in engagement with the said ratchet teeth 12. The parts on the shaft 4 at one side of its center are exactly like the parts on the other side thereof. The hub 10 is centrally supported in bearings 28 which are sustained by a strong horizontal bracket or support 29 extending from and integral with a plate 27. Thus the shaft is supported centrally as well as near its opposite ends.

When this windlass is operated by the brakes the bevel-gear 16 operates alternately the bevel-segment gears 15, one brake-handle operating one of the said segment gears, and the other brake-handle the other, the two series of pawls 23 slipping over the two ratchet wheels 11, 12 alternately. As the movement of the disk-plates 14 is reciprocating rotative movement it is unnecessary that the bevel-gears 15 should extend entirely around the plates. They are made therefore long enough only to accommodate the partial and reciprocating rotation of the bevel-gear 16. Of course with each lowering of each handle on the brakes the entire squared shaft and the drums 5 and 6 on each end thereof, together with the hub 10 and its flanges 11 are rotated in the same direction, and back-lash or lost motion is effectually prevented by the holding pawls 24 which bear against the ratchet teeth 12. There is therefore in this operation no twisting of the shaft as the mechanisms on both sides rotate together whereby the strain is balanced and equalized, and no possible slipping, and the holding pawls supplement the gravity-pawls or ratchets 23, and are exceedingly useful when the vessel is riding in a heavy sea.

Having thus fully described my invention, what I claim, and desire to secure by Letters Patent is:—

1. In a windlass, a squared shaft extending the entire length thereof, a pair of hubs mounted centrally on said shaft and rigid therewith said hubs being provided at their outer ends with flanges having ratchet teeth on their peripheries, windlass-barrels or main drums rigid on said shaft next the outer ends of said hubs, end-drums rigid on said shaft next the outer ends of the main drums, disk-wheels mounted on the hub next said flanges and provided with ratchet pawls adapted to engage the ratchet teeth, bevel-gears on the inner faces of the disk-wheels, a horizontal rocking shaft extending between said bevel-gears, a bevel-gear on said rocking shaft in engagement with the bevel-gears on the disk-wheels, and a suitable brake-mechanism adapted to actuate the rocking shaft, substantially as set forth.

2. In a windlass, a squared shaft extending the entire length thereof, a pair of hubs mounted centrally on said shaft and rigid therewith said hubs being provided at their outer ends with flanges having ratchet teeth on their peripheries, windlass-barrels or main drums rigid on said shaft next the outer ends of said hubs, end-drums rigid on said shaft next the outer ends of the main drums, disk-wheels mounted on the hub next said flanges and provided with ratchet pawls adapted to engage the ratchet teeth, bevel-gears on the inner faces of the disk-wheels, a horizontal rocking shaft extending between said bevel-gears, a bevel-gear on said rocking shaft in engagement with the bevel-gears on the disk-wheels, holding pawls extending from the stationary portion of the windlass into engagement with the ratchet teeth, a central support sustaining the hubs and the central portion of the shaft, and supports for the shaft between the outer ends of the main drums and the inner ends of the end-drums, substantially as set forth.

In testimony whereof I have signed my name to this specification in the presence of two subscribing witnesses.

CHARLES H. RICHARDSON.

Witnesses:
H. BERT KNOWLES,
ROGER A. CONANT.